United States Patent
Kane

[15] 3,685,126
[45] Aug. 22, 1972

[54] HOLE-ALIGNING TOOL
[72] Inventor: John J. Kane, 5712 Cumberland Dr., Garfield Heights, Ohio 44125
[22] Filed: June 9, 1969
[21] Appl. No.: 831,419

[52] U.S. Cl. ..........................29/254, 29/271, 29/275
[51] Int. Cl. ............................................B23p 19/04
[58] Field of Search........29/254, 275, 274, 273, 272, 29/271; 81/3.48, 3.49

[56] References Cited

UNITED STATES PATENTS

| | | | |
|---|---|---|---|
| 1,109,094 | 9/1914 | Weckbaugh | 29/271 X |
| 1,838,134 | 12/1931 | Cozzens | 29/271 |
| 2,629,985 | 3/1953 | McDowell | 29/275 X |
| 2,788,571 | 4/1957 | Buhl | 29/275 |

Primary Examiner—Andrew R. Juhasz
Assistant Examiner—Leon Gilden
Attorney—Ely, Golrick & Flynn

[57] ABSTRACT

A tool for aligning holes in overlapping structural members having a stepping segment for insertion in the holes, a shank extending rearward from the insertion segment, and a massive impact member slidable on the shank to strike an impact blow against a shoulder at the inner end of the shank to drive the insertion segment into the holes.

4 Claims, 3 Drawing Figures

PATENTED AUG 22 1972

3,685,126

INVENTOR.
JOHN J. KANE
BY
ELY, GOLRICK & FLYNN

ATTORNEYS

HOLE-ALIGNING TOOL

This invention relates to a tool for aligning similar holes in overlapping structural members.

Various building structures, bridges, towers and the like have a skeleton framework including structural members, such as beams girders, and/or plates, which are bolted together where they overlap. Such structural members, prior to delivery and assembly at the site, are usually cut to the requisite length, shaped, and drilled to provide holes for fastening means in a shop, where such machining operations can be carried out under conditions which permit the precision that has become especially necessary for assembly at the site. For many years it was the standard (and colorful as well as deafeningly noisey) practice to assemble such "high iron" work by hot riveting; this required a crew consisting at least of a crane operator to lift the structural members into approximate position, a forge operator who heated the rivets to an incandescent malleable state, a "catcher" who caught the hot rivets thrown from the forge and inserted them in approximately aligned holes and then served as the back-up man for the riveter whose air-hammer peened the protruding end of the rivet inserted through the over-lapping holes while simultaneously swaging and fulling the hot rivet so that the rivet, in theory at least, completely filled the holes, irrespective of the preciseness of their alignment or out-of-roundness.

The above riveting practice by which structural steel was assembled for generations has now been largely supplanted by the development of high tensile strength bolts and nuts which permit the structural members to be simply bolted together. This can often be done by a crew that need consist of no more than the crane operator who hoists the structural member to the assembly position and a bolter who inserts the bolts and secures them with an appropriate torque wrench. In addition to the substantial reduction in assembly labor, such bolted construction has been found to be stronger and more earthquake-resistant than the prior riveted construction, provided, of course, that the overlapping connecting holes are matched into alignment and precisely fitted by the bolts. This bolting practice necessitates positioning the overlapping structural members with their bolt holes in precise alignment just before they are bolted together. This has been a difficult and time consuming operation, particularly where the structural members are relatively heavy and must be hoisted to the assembly position by a crane.

It also posed problems for the bolter and endangered other workers on the site as well as the strength of the bolted structure. In order to bring the bolt holes into final alignment, the bolter has heretofore followed the conventional practice of using tapered drift pins which he would drive with a hammer into a pair of approximately aligned holes, drive bolts into successive holes, and then successively remove the drift pins for final bolting of the holes from which they were removed. If such a tapered drift pin is subjected to a substantial side load when inserted, it tends to deform the holes and, particularly if the protruding inserted end of such a drift pin is in close quarters which prevent a direct axial end blow by a hammer to drive it out, the bolter has no choice but to loosen such a pinched drift pin either by side blows or "worrying" it out by a pipe wrench, which can further deform the bolt holes so that they will no longer fit the bolts with the precision by which the strength of a bolted structure is secured. Also, the very number of tools, i.e., a heavy hammer, drift pins, wrenches, pipe wrenches, etc., which, in addition to the bolts and nuts, a bolter must have at hand while often working in a precarious position where he must use one hand for his own safety, increases the probability that one or more may be dropped, endangering other workers and, in any event, slowing the work while the dropped necessary tool or part is retrieved.

The present invention is directed to a novel and improved tool which facilitates the alignment of such structural members just before they are bolted together, thereby relieving the crane operator of much of the problem of bringing the structural members into exact alignment.

Accordingly, it is a principal object of this invention to provide a novel and improved tool for aligning similar holes in overlapping structural members.

Another object of this invention is to provide such a tool which can be operated conveniently to bring overlapping structural members into precise final alignment after they have been positioned initially in approximate alignment.

Another object of this invention is to provide such a tool which can be operated manually by only one workman to effect the final alignment of overlapping structural members.

Further objects and advantages of this invention will be apparent from the following detailed description of a presently-preferred embodiment thereof, which is illustrated in the accompanying drawing.

Figure 1:
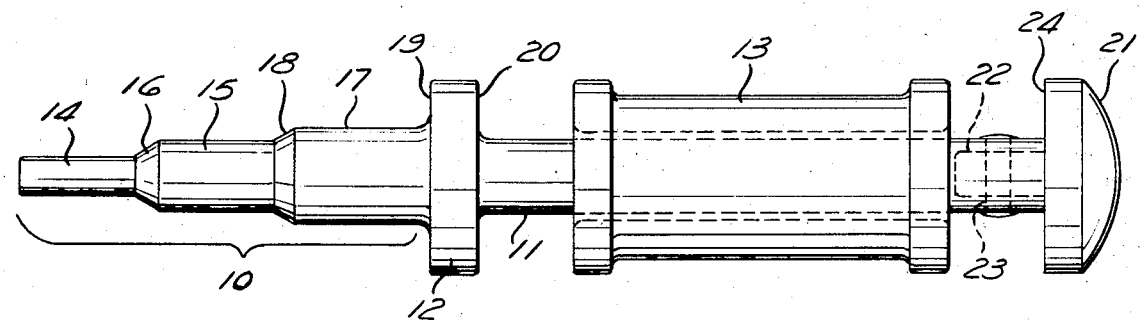
FIG. 1 is an elevational view of the present tool.

Referring to FIG. 1, in general outline the present tool has a stepped insertion segment 10, a shank 11 extending rearward from the insertion segment and coaxial with the latter, a transverse enlargement 12 connected between the insertion segment 10 and the shank 11, and a massive impact member 13 slidably mounted on the shank 11. Preferably, the insertion segment 10, transverse enlargement 12, and shank 11 are a one-piece, integrally formed body of suitable metal.

The insertion segment 10 is of stepped construction, with a small diameter cylindrical section 14 at its front end, and intermediate cylindrical section 15 of larger diameter behind the front end section and joined to the latter by a shorter frusto-conical tapered portion 16, and a rear cylindrical section 17 of still larger diameter behind the intermediate section 15 and joined to the latter by a shorter frusto-conical tapered portion 18. The three sections 14, 15 and 17 have diameters corresponding to standard bolt hole sizes, and in one practical embodiment they may be ⅝ inch, ¾ inch and 1 inch in diameter, respectively, with a length of 1½ inch each.

The transverse enlargement 12 is cylindrical and it presents a forwardly-facing, transverse, annular shoulder 19 behind the rear section 17 of the insertion segment 10 and a rearwardly-facing, transverse, annular shoulder 20 at the inner end of the shank 11.

The shank 11 is cylindrical and in the embodiment illustrated it is of the same diameter as the rear section 17 of the insertion segment 10. An enlarged head 21 is attached to the back end of the shank. This head has an integral stem 22 received in a complementary drilled opening in the back end of the shank and the parts are fastened together by a radially-disposed pin 23. The head 21 presents a forwardly-facing, transverse, annular shoulder 24 which limits the rearward retraction of the impact member 13.

The impact member 13 is a relatively heavy sleeve of suitable metal which encircles the shank 11 and is freely slidable thereon.

Figure 2:
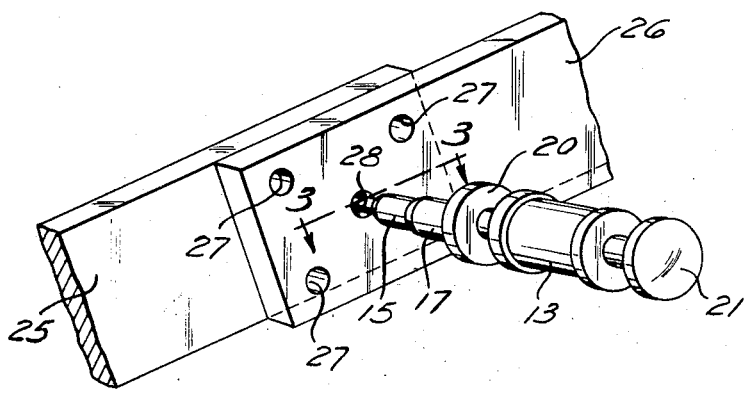
FIG. 2 is a framentary perspective view illustrating the manner of using the present tool to align two overlapping structural members.

FIG. 2 illustrates the manner in which the present tool may be used. The two structural members which are to be bolted together are shown as metal plates 25 and 26 which overlap at their adjacent ends. The two plates have identical groups of bolt holes, here shown as four corner holes 27 arranged rectangularly about a central hole 28. As shown, the central holes 28 are used for alignment purposes but it is to be understood that any pair of corresponding holes in the two structural may be used for this purpose.

Figure 3:
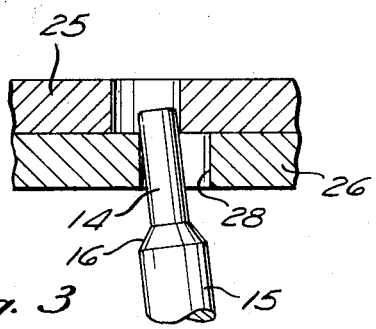
FIG. 3 is a fragmentary sectional view taken along the line 3—3 in FIG. 2 and showing the overlapping structural members with their holes partially aligned.

With the two plates 25 and 26 having been positioned as shown to bring their corresponding bolt holes in approximate registration with each other, (for example, as shown in FIG. 3) the user inserts the front end section 14 of the insertion segment through the central hole in the plate 26 closest to him and as far as possible into the corresponding hole in the plate 25 behind. Then, the user slides the impact member 13 rapidly forward along the shank 11 to strike the shoulder 20 an impact blow which drives the insertion segment 10 farther through these holes to bring them into final alignment. For example, if these holes are ¾ inch in diameter, this impact blow (or a series of them, if necessary) will force the front end section 14 completely through the hole in the back plate 25 and then the tapered portion 16 will pass into this hole and displace the back plate 25 laterally enough to effect the precise alignment of the holes in the two plates, after which the intermediate portion 15 of the insertion segment will enter the hole in the back plate to hold the plates in proper alignment.

It will be evident that the insertion segment 10 of the tool may have as many cylindrical sections as may be necessary to accommodate the different bolt hole sizes which may be encountered in actual practice and that the length of each cylindrical segment should be such that it can extend simultaneously through the holes in the overlapping structural members for final alignment. If desired, the tool might be modified to provide spring or other power actuation of the slidable impact member 13 to drive it against the shoulder 20, instead of doing this completely manually.

I claim:

1. A tool for aligning similar holes in overlapping structural members, said tool comprising an insertion segment having a front end for insertion into the holes to be aligned, said segment and having successive longitudinal sections of increasing cross section towards the rear, the cross section of each of said sections being constant throughout its length and thereof shaped to fit snugly but slidably in said holes, a shank extending rearward from said insertion segment, a transverse enlargement connected between the rear end of said insertion segment and the shank and presenting a rearwardly-facing transverse shoulder at the front end of said shank, and a massive impact member slidably mounted on said shank for imparting a forwardly-directed impact blow against said shoulder.

2. A tool according to claim 1, wherein said impact member is an annular body encircling said shank.

3. A tool according to claim 1, and further comprising means providing an enlarged head on the rear end of said shank for limiting the rearward retraction of said impact member.

4. A tool according to claim 3, and further comprising tapered portions interconnecting the successive sections of the insertion segment.

* * * * *